US009335956B2

(12) United States Patent
Hori

(10) Patent No.: US 9,335,956 B2
(45) Date of Patent: May 10, 2016

(54) PRINT CONTROL APPARATUS AND METHOD FOR PRINTING IN WHICH A FOLDING POSITION IS DISPLAYED

(75) Inventor: Daisuke Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 13/570,565

(22) Filed: Aug. 9, 2012

(65) Prior Publication Data

US 2013/0045851 A1 Feb. 21, 2013

(30) Foreign Application Priority Data

Aug. 16, 2011 (JP) ................................ 2011-177866

(51) Int. Cl.

| | |
|---|---|
| ***G06K 15/00*** | (2006.01) |
| ***G06F 3/12*** | (2006.01) |
| *G03G 15/00* | (2006.01) |
| *B65H 45/20* | (2006.01) |
| *G06K 15/02* | (2006.01) |

(52) U.S. Cl.

CPC .......... *G06F 3/1204* (2013.01); *G03G 15/5095* (2013.01); *G03G 15/6544* (2013.01); *G06F 3/1251* (2013.01); *G06F 3/1254* (2013.01); *B65H 45/20* (2013.01); *G03G 15/6582* (2013.01); *G03G 2215/00877* (2013.01); *G06F 3/1208* (2013.01); *G06K 15/021* (2013.01)

(58) Field of Classification Search

CPC ........... G03G 15/5095; G03G 15/6544; G06F 3/1254

USPC ........................................................ 358/1.18

See application file for complete search history.

(56) References Cited

U.S. PATENT DOCUMENTS

| | | | | |
|---|---|---|---|---|
| 2004/0190063 | A1 * | 9/2004 | Brown | H04N 1/00132 358/1.18 |
| 2006/0114490 | A1 * | 6/2006 | Rolleston | 358/1.14 |
| 2006/0136087 | A1 * | 6/2006 | Higashiura | 700/116 |
| 2006/0238777 | A1 * | 10/2006 | Anno et al. | 358/1.1 |
| 2008/0174061 | A1 * | 7/2008 | Kurita | B65H 45/20 270/45 |
| 2009/0253564 | A1 * | 10/2009 | Butterworth | B65H 45/24 493/357 |
| 2009/0275456 | A1 * | 11/2009 | Neubauer et al. | 493/421 |
| 2010/0001451 | A1 * | 1/2010 | Nishimura | 270/37 |
| 2010/0167891 | A1 * | 7/2010 | Sakata | B65H 45/142 493/25 |
| 2012/0250054 | A1 * | 10/2012 | Mitsuhashi | H04N 1/506 358/1.13 |

FOREIGN PATENT DOCUMENTS

| | | | |
|---|---|---|---|
| JP | 2001-230926 | A | 8/2001 |
| JP | 2002-232682 | A | 8/2002 |
| JP | 2006-326870 | A | 12/2006 |
| JP | 2007-219429 | A | 8/2007 |
| JP | 2010-128712 | A | 6/2010 |
| JP | 2010-237749 | A | 10/2010 |
| JP | 2010-277428 | A | 12/2010 |

* cited by examiner

*Primary Examiner* — Miya J Cato

(74) *Attorney, Agent, or Firm* — Canon USA, Inc. IP Division

(57) ABSTRACT

In a print control apparatus, a specifying unit specifies a size in a first direction and/or a size in a second direction perpendicular to the first direction thereby specifying a folding size into which to fold a sheet with a printed image. A determination unit determines an output size in which the image is to be printed, based on a size equal to an integral number times the specified size in the first direction and/or a size equal to an integral number times the specified size in the second direction.

17 Claims, 11 Drawing Sheets

S501
S601 IS "ADJUST PRINTING MATERIAL SIZE" CHECKBOX CHECKED? (YES / NO)
S602 IS VERTICAL LENGTH OF PRINTING MATERIAL EQUAL TO INTEGRAL MULTIPLE OF VERTICAL LENGTH OF PAPER FOLDING SIZE? (YES / NO)
S603 CHANGE VERTICAL LENGTH OF PRINTING MATERIAL TO INTEGRAL MULTIPLE OF VERTICAL LENGTH OF PAPER FOLDING SIZE
S604 IS HORIZONTAL LENGTH OF PRINTING MATERIAL EQUAL TO INTEGRAL MULTIPLE OF HORIZONTAL LENGTH OF PAPER FOLDING SIZE? (YES / NO)
S605 CHANGE HORIZONTAL LENGTH OF PRINTING MATERIAL TO INTEGRAL MULTIPLE OF HORIZONTAL LENGTH OF PAPER FOLDING SIZE
S606 MODIFY PRINT DATA TO ADAPT TO SPECIFIED PRINT POSITION
S607 IS "ADJUST PRINT PAPER SIZE" CHECKBOX CHECKED? (YES / NO)
S608 MODIFY PRINT DATA TO ADAPT TO PRINT SPECIFIED FOLDING LINE
S609 IS "PRINT CUTTING LINE" CHECKBOX CHECKED? (YES / NO)
S610 MODIFY PRINT DATA TO ADAPT TO PRINT CUTTING LINE
END 700 mm
500 mm
PAPER FOLDING SETTING
200 mm
1102
PAPER FOLDING SETTING
PAPER FOLDING METHOD
ACCORDION FOLD
PAPER FOLDING SIZE
STANDARD SIZE
ISO A4
NONSTANDARD SIZE
VERTICAL 200 mm, HORIZONTAL — mm
PRINT FOLDING LINE
PRINT CUTTING LINE
ADJUST PRINT PAPER SIZE
PRINT POSITION CENTER
PROVIDE BINDING MARGIN
1101
OK
CANCEL
PRINT
800 mm + BINDING MARGIN
1103
500 mm
200 mm

PRINT CONTROL APPARATUS AND METHOD FOR PRINTING IN WHICH A FOLDING POSITION IS DISPLAYED

BACKGROUND OF THE INVENTION

1. Field of the Invention

One aspect of embodiments relates to a print control apparatus adapted to printing an image on a sheet, and a method thereof.

2. Description of the Related Art

In some cases, printed materials produced by a printer or the like are folded and stored in a binder or the like. For example, a printed material is folded and stored in an envelope-shaped case bound in a binder, or a printed material itself is bound in a folded fashion in a binder. In some other cases, printed materials are folded and put in a case or a box with a particular size.

Japanese Patent Laid-Open No. 2007-219429 discloses a technique that enables a user to specify an arbitrary paper folding size (a size of a printed material in a folded form). This technique allows a user to obtain a printed material folded into an arbitrary size specified by the user.

However, in the technique described above, to prevent a folded printed material from having an excess area with a size smaller than the folding size at an end of the finally folded printed material, a user has to specify the paper folding size taking into account the original length of the printed material, and thus the user has to know the original length of the printed material. If an excess area occurs, the folded printed material is not beautiful.

SUMMARY OF THE INVENTION

In view of the above, one aspect of embodiments provides a technique to obtain a printed material which has a beautiful form after folding.

According to an aspect of embodiments, a print control apparatus includes a specifying unit configured to specify a size in a first direction and/or a size in a second direction perpendicular to the first direction thereby specifying a folding size into which to fold a sheet with a printed image, and a determination unit configured to determine an output size in which the image is to be printed, based on a size equal to an integral number times the specified size in the first direction and/or a size equal to an integral number times the specified size in the second direction.

The print control apparatus is capable of providing a printed material that may be folded into a specified size in a beautiful form with no unnecessary remainder.

Further features of the present invention will become apparent from the following description of exemplary embodiments with reference to the attached drawings.

DESCRIPTION OF THE EMBODIMENTS

Embodiments are described below.

First Embodiment

Figure 1:
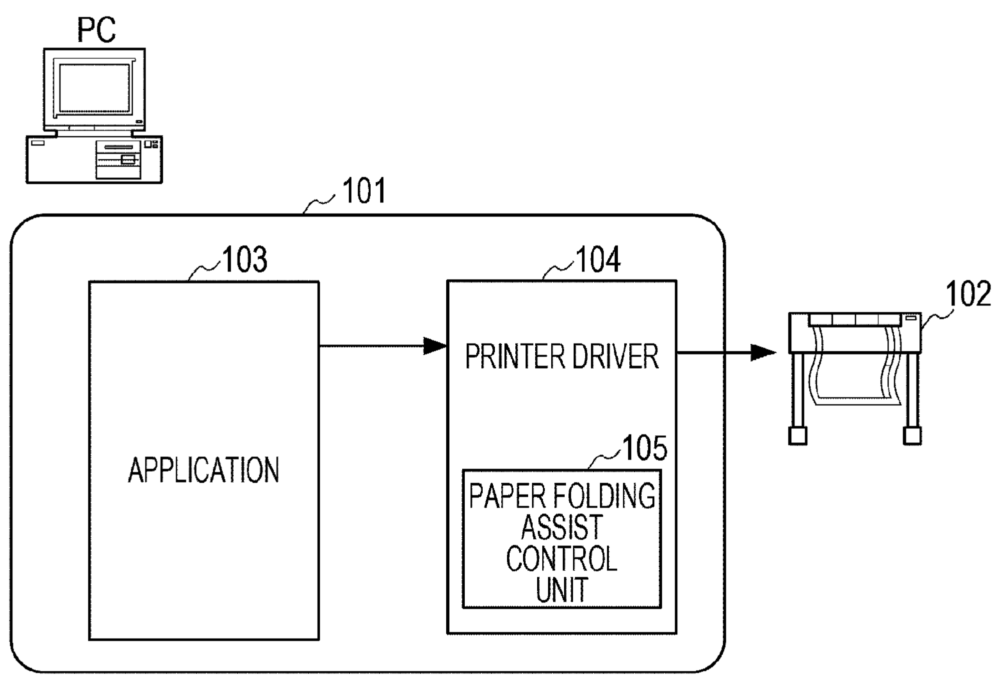
FIG. 1 is a diagram illustrating a configuration of a printing system according to an embodiment.

FIG. 1 is a diagram illustrating a printing system PS 1 including a print control apparatus according to a first embodiment.

The printing system PS 1 includes a PC 101 functioning as the print control apparatus and a printer 102 configured to print an image on a sheet. The PC 101 includes an application 103 and a printer driver 104.

The application 103 operates on the PC 101 and has a function of generating data to be printed. To print the data generated by the application 103, a user selects PRINT from a menu of the application 103. In response, the application 103 requests an operating system (OS) to print the data. In response, a print command is sent to the printer driver 104 via the OS. The printer driver 104 interprets the print command received via the OS and generates print data interpretable by the printer 102. The printer 102 interprets the print data received from the PC 101 and prints an image on a sheet by applying a recording agent to the sheet according to the print data. The printer 102 is capable of printing an image on a continuous sheet such as roll paper. The printer 102 may include a cutter to automatically cut off a sheet on which an image has been printed to obtain printed materials each having a printing material size specified by the PC 101. When a sheet is automatically cut off using the cutter, cutting is allowed only in a direction perpendicular to a direction in which the sheet is conveyed. To cut off a sheet in a direction parallel to the direction of conveying the sheet, a cutting line is printed so that a user is allowed to cut off the sheet along the cutting line using a pair of scissors or the like. The printed cutting line may be a graphic symbol or a series of graphic symbols. Note that the term "printing material size (output size)" refers to a final size of a printed material obtained after the sheet is cut off.

The printer driver 104 includes a paper folding assist control unit 105 having a function of adding a folding line to print data to assist a user in folding the sheet. The paper folding assist control unit 105 also has other functions including a function of changing the printing material size based on a size obtained after folding the sheet (hereafter referred to as a paper folding size or a folding size). In the first embodiment, the paper folding assist control unit 105 is one of the functions provided by the printer driver 104. However, the paper folding assist control unit 105 may be implemented as an application that operates independently of the printer driver 104 such that the paper folding assist control unit 105 receives print data from the application 103 and processes the received print data.

Figure 2:
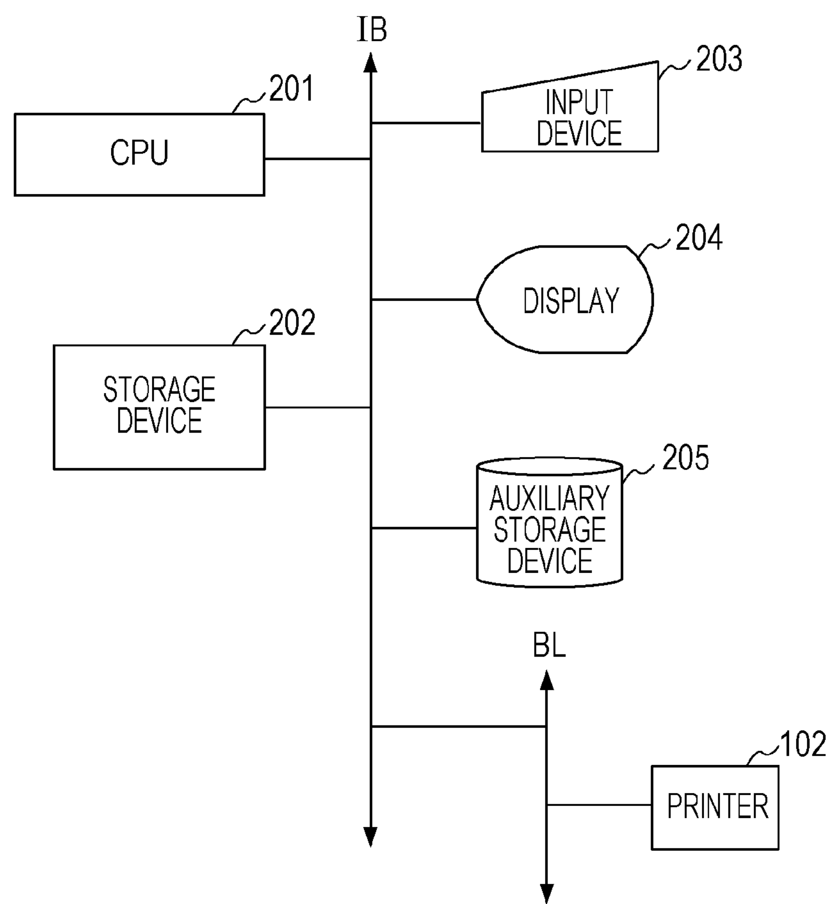
FIG. 2 is a block diagram illustrating an internal structure of a personal computer (PC) and a manner in which the PC is connected to external devices.

FIG. 2 is a block diagram illustrating an internal structure of the PC 101 and a manner in which the PC 101 is connected to external devices.

The PC 101 includes a central processing unit (CPU) 201, a storage device 202 such as a RAM, an input device 203 such as a mouse, a keyboard, or the like, a display apparatus 204 such as a CRT (cathode ray tube), a LCD (liquid crystal display), or the like, and an auxiliary storage apparatus 205 such as a hard disk, a magneto-optical disk, or the like. These components of the CPU 201 are connected to each other via an internal bus line IB.

The auxiliary storage apparatus 205 stores programs of the application 103, the printer driver 104, the OS, and the like. The central processing unit 201 calls programs stored in the auxiliary storage apparatus 205 as required and loads them into the storage device 202. The central processing unit 201 executes programs to perform processes, which will be described below. A user inputs commands or data using the input device 203 according to a screen that is displayed on the display apparatus 204 by the application 103, the printer driver 104, and the like. The internal bus line IB of the PC 101 is connected to the printer 102 via an external bus line BL. The PC 101 transmits print data to the printer 102 via the external bus line BL.

To perform printing, a user produces a document using the application 103 and selects a PRINT command from a menu of the application 103 to activate a print dialog. The user then selects the printer 102 via the print dialog provided by the application 103 and presses down a PROPERTY button or the like. In response, a UI (user interface) screen D1 (see FIG. 3) is opened by the printer driver 104 for the printer 102 whereby the user is allowed to check print setting or change it.

Figure 3:
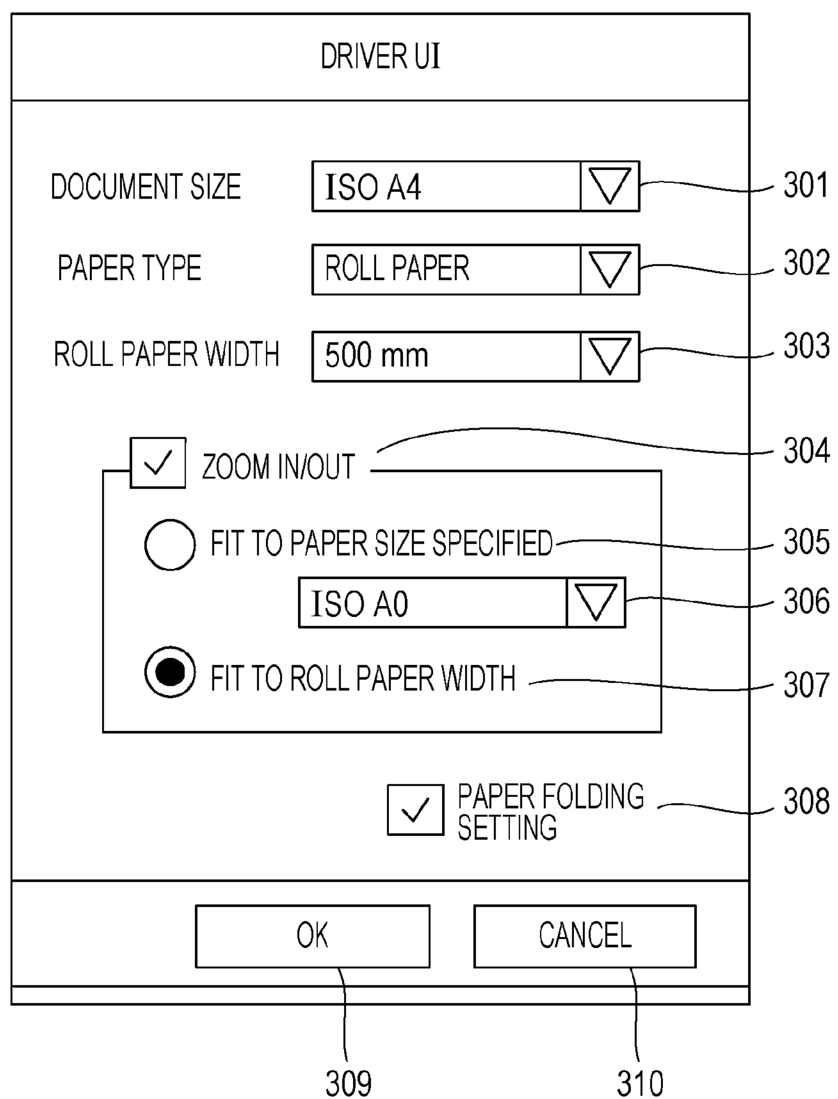
FIG. 3 is a diagram illustrating an example of a user interface (UI) screen of a printer driver.

FIG. 3 is a diagram illustrating an example of a UI screen D1 of the printer driver 104 displayed on the display apparatus 204.

A combo box 301 is for setting a document size. The printer driver 104 instructs the application 103 to output data to be printed such that the document size accords with the value specified via the combo box 301. A combo box 302 is for setting a paper feeding method (sheet type) to be employed by the printer 102 in feeding sheets. A combo box 303 is for setting a roll paper width when a roll paper is fed by the printer 102.

A check box 304 is for setting whether enlargement/reduction is to be performed in printing a document. In a case where this check box is checked, when there is a difference between the printing material size and the document size specified in the combo box 301, the data to be printed output from the application 103 is enlarged or reduced. A radio button 305 is enabled in a state in which the check box 304 is checked. When the radio button 305 is checked, it is allowed to specify a document size by selecting a printing material size in a combo box 306 such that printing is to be performed in an enlarged or reduced size specified. A radio button 307 is also enabled when the check box 304 is checked. If the radio button 307 is checked, printing is set to be performed such that the width of the data (document) output from the application 103 is enlarged or reduced to fit the roll paper width specified in the combo box 303.

A check box 308 is for setting whether to perform setting as to paper folding using the paper folding assist control unit 105. If this check box 308 is checked, a user is allowed to perform setting as to a paper folding method, a paper folding size, and so on.

After setting has been performed in the above-described manner, if an OK button 309 is pressed, then the setting as to the printer driver 104 is completed. On the other hand, if a CANCEL button 310 is pressed, a change in setting is discarded and default setting of the printer driver 104 is employed or the screen returns to the print dialog of the application 103 while maintaining the previous setting.

After the setting as to the printer driver 104 is completed, if a START PRINT button or the like in the print dialog of the application 103 is pressed, print data is supplied from the application 103 to the printer driver 104 according to the setting performed in the UI screen D1 and processing is performed on the print data according to the setting. The print data processed by the printer driver 104 and information indicating the setting performed in the UI screen D1 are sent to the printer 102. The printer 102 performs printing according to the setting.

Figure 4:
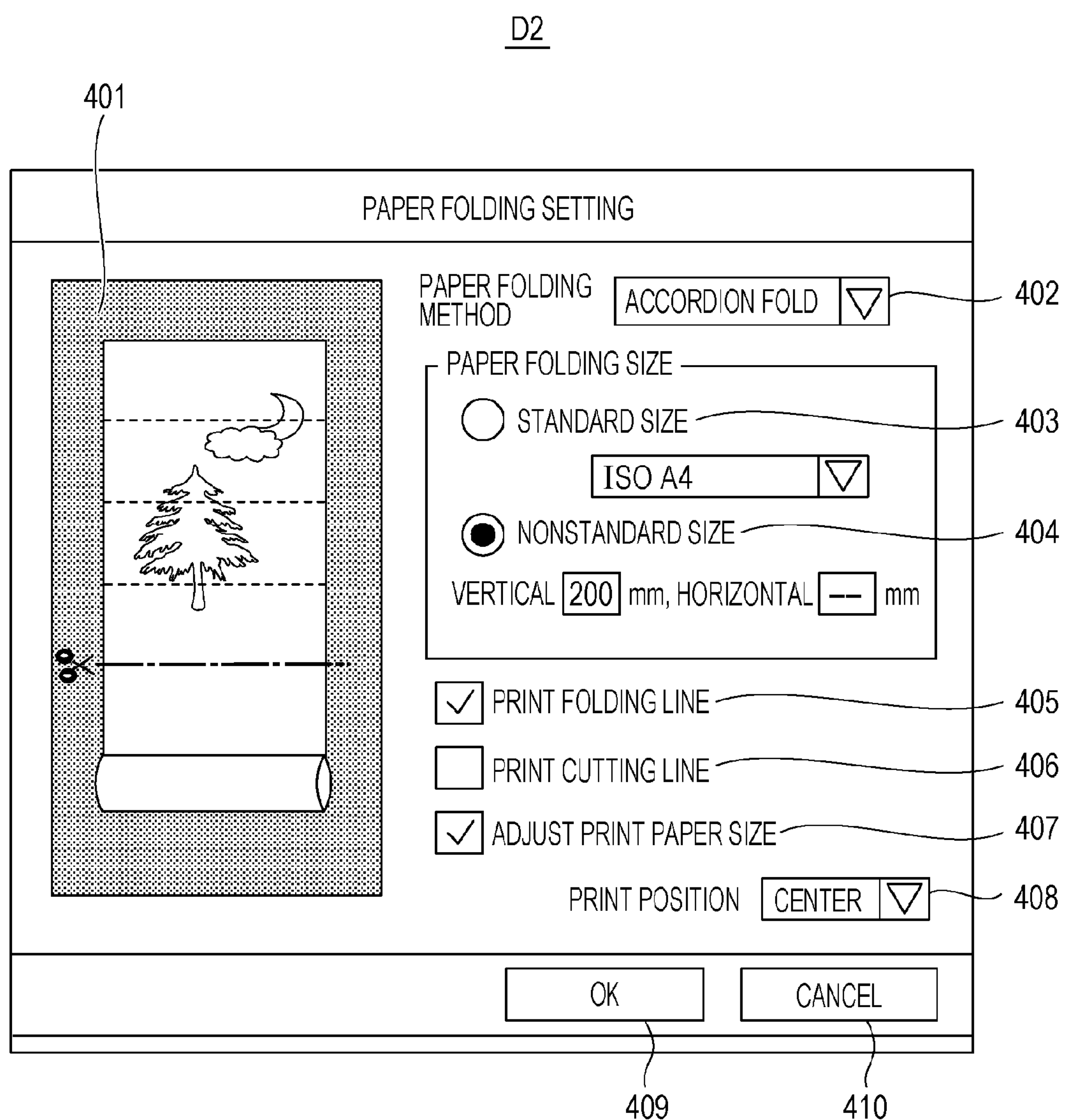
FIG. 4 is a diagram illustrating a dialog screen for setting paper folding conditions.

FIG. 4 is a diagram illustrating a dialog screen D2 that is displayed when the check box 308 is checked for setting in terms of paper folding.

A preview area 401 is an area in which a preview image of the document generated by the application 103 and a position at the printing material of folding line determined by paper folding setting are displayed. When the printer 102 prints an image, printing material is conveyed in a down-to-up direction in the preview area.

A combo box 402 is for selecting a paper folding method by which to fold a sheet after printing is performed. Paper folding methods selectable here includes an accordion fold, a cross fold, etc. In a case where the printer 102 has a sheet folding apparatus, sheets may be folded by the sheet folding apparatus according to the selected paper folding method. A line depending on the paper folding method (a mountain fold, a valley fold, etc.) may be printed regardless of whether the printer 102 has a sheet folding apparatus. Depending on the paper folding method set in the combo box 402, a paper folding size is specified in a combo box 403 or a text box 404. To select a standard size as the paper folding size, the standard size such as ISO A4 is specified in the combo box 403. To specify a nonstandard size as the paper folding size, an arbitrary desired length is input in the text box 404. When the standard size is specified as the paper folding size, long sides of the paper folding size may be set to be parallel to a width direction of printing material. More specifically, when the ISO A4 size is specified, the printing material is sequentially folded into the A4 size that is in a landscape position when viewed in the preview area 401. As a matter of course, short sides of the paper folding size may be set to be parallel to a width direction of printing material. When a nonstandard size is specified as the paper folding size, the horizontal length of the paper folding size may be set in the width direction of the printing material width, the vertical length of the paper folding size may be set in the direction perpendicular to the width direction of the printing material. In nonstandard sizes, it may be allowed to specify only the vertical size or the horizontal size.

A check box 405 is for specifying whether a folding line is actually printed on printing material. If this setting is activated by a user, a folding line is printed on printing material according to a specified paper folding size. The printed folding line may be a graphic symbol or a series of graphic symbols. The printed folding line allows a user to easily recognize a folding position at which to fold the printing material, and thus the printed folding line may be printed if the user desires it. Note that the folding line may be displayed in the preview area 401 regardless of whether the check box

405 is checked or not. In this case, when the paper folding size is changed, the result is immediately displayed in the preview area 401.

A check box 406 is for specifying whether a cutting line corresponding to the printing material size is to be printed on the printing material. By cutting off the printing material along the cutting line, it is possible to obtain the printed material having the specified printing material size.

A check box 407 is for specifying whether the printing material size is to be changed depending on the paper folding size specified in the combo box 403 or the text box 404. In a state in which this setting is activated, when the paper folding size is sequentially multiplied by an integral number while incrementing the integral number, if the printing material size specified in the UI screen D1 has a remainder smaller than the paper folding size, then a blank area is added to the printing material size such that the remainder becomes equal to the paper folding size. That is, when a remainder smaller than the paper folding size occurs, the printing material size is changed to a value different from the original value of the printing material size by adding the blank area. On the other hand, when the remainder smaller than the paper folding size is less than a predetermined value, the remainder may be discarded such that the printing material size is reduced to a value equal to an integral number times the paper folding size. When the remainder smaller than the paper folding size is discarded, the discarding may be performed only from a blank area. In a case where the printing material size is nearly equal to the paper folding size, the printing material size is equal to one times the paper folding size, and thus no folding occurs. In such a case, the printing material size may be set to be equal to two or greater integral number times the paper folding size such that the resultant printed material is allowed to be folded. In this case, a user may be allowed to specify whether the printing material size is changed to two or greater integral number times the paper folding size. It may be allowed to specify whether the printing material size in the vertical or horizontal direction is to be adjusted to make it possible to fold the paper according to the specified paper folding method and further specify the amount of adjustment. When this setting is activated by a user, it is possible to obtain the printed material with the output size equal to an integral number times the paper folding size specified by the user without creating an excess area smaller than the folding width whereby it is possible to fold the printed material into the paper folding size specified by the user. The changed printing material size is reflected in the setting in the UI screen D1. For example, in the UI screen D1 shown in FIG. 3, the check box 304 and the radio button 305 are automatically checked. Furthermore, the changed printing material size is set in the combo box 306 as the nonstandard size.

A combo box 408 is enabled when the check box 407 is checked. When the printing material size is adjusted and changed in the above-described manner, the combo box 408 may be used to specify the position at which the original document image is to be printed on the printing material. Choices in this combo box 408 may include upper left, left, lower left, upper, center, lower, upper right, right, and lower right, indicating a printing position of the image as viewed from front (as viewed in the preview area 401). A user is allowed to select one of these choices. In the present embodiment, whenever the paper folding size is changed, the result is immediately reflected in the preview area 401 such that a user is allowed, based on the folding lines displayed in the preview area 401, to select a proper position at which the original image is to be printed.

In the state in which the setting is performed in the above-described manner, if the OK button 409 is pressed, the setting is complete and the screen returns to the UI screen D1. On the other hand, if a CANCEL button 410 is pressed, a change in setting is not employed but default setting of the paper folding setting or the previous setting is employed, and the paper folding setting is ended.

Next, a printing process using the paper fold assist function according to the present embodiment is described below.

Figure 5:
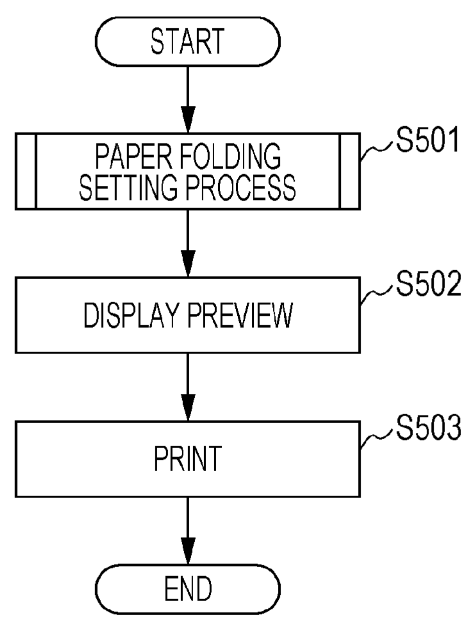
FIG. 5 is a flow chart illustrating a process including a paper folding setting process.

FIG. 5 is a flow chart illustrating a printing process using a paper fold assist function. The process shown in this flow chart is performed by the central processing unit 201 by executing a program of the printer driver 104 stored in the auxiliary storage apparatus 205.

First, a user produces data to be printed using the application 103 and then displays the UI screen D1 of the printer driver 104 via the print menu. If the check box 308 is checked by the user, the paper folding assist control unit 105 displays the dialog screen D2 shown in FIG. 4 on the display apparatus 204. The process then proceeds to step S501. In step S501, the user performs setting as to paper folding such as a folding line position adjustment, a paper folding size adjustment, and/or the like. This process will be described in further detail below.

Next, in step S502, a preview image is displayed in the preview area 401 such that the printing material size, the folding line position, and the cutting line position calculated in step S501 are reflected in the displayed preview image. Thereafter, if the OK button 409 is pressed to complete the paper folding setting and a START PRINT command is issued, then in step S503 print data modified to adapt to the setting performed via the previous steps and information indicating the contents of the setting are sent to the printer 102. The printer 102 performs printing.

Figure 6:
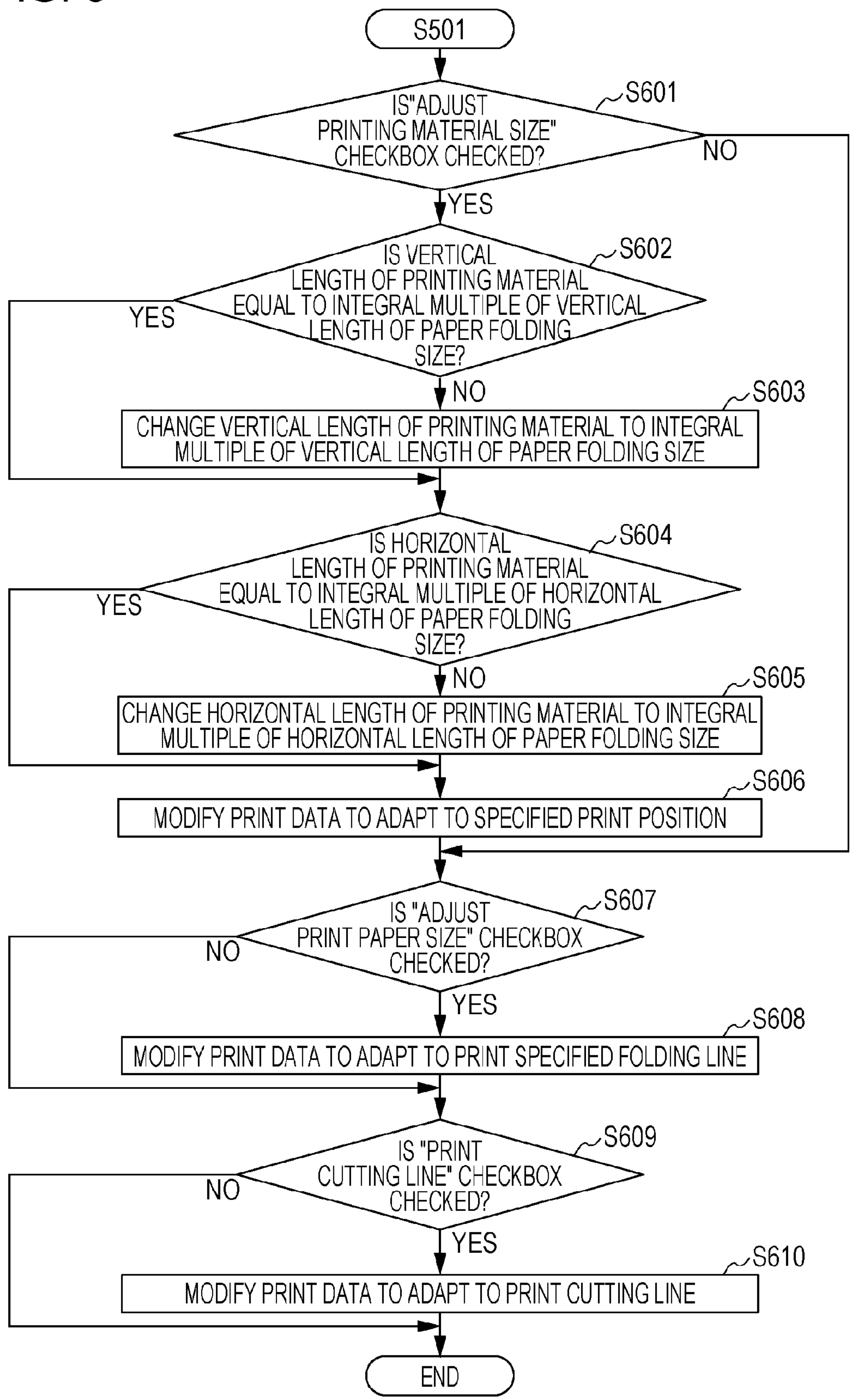
FIG. 6 is a flow chart illustrating details of the paper folding setting process shown in FIG. 5.

FIG. 6 is a flow chart illustrating details of the paper fold setting process (performed in step S501).

First, in step S601, a determination is performed as to whether the check box 407 is checked. If it is determined that the check box 407 is checked, then the process proceeds to step S602, but otherwise the process proceeds to step S607.

In step S602, a calculation is performed to determine the ratio of the vertical length of the printing material size determined according to the setting specified via the UI screen D1 to the vertical length of the paper folding size specified in the combo box 403 or the text box 404. Note that in determining the printing material size according to the specifications given in the UI screen D1, the printing material size is determined based on the document size specified in the combo box 301 and the enlargement/reduction setting specified in the boxes 305 to 307. In a case where the check box 304 is not checked, the printing material size is determined to be equal to the document size. On the other hand, if the check box 304 is checked, the printing material size is determined to be equal to a size obtained by enlarging or reducing the document size according to the setting. Note that the vertical direction of the printing material size and that of paper folding size are defined in the same direction as a direction in which the printer 102 conveys the printing material. Thereafter, a determination is performed as to whether the calculated length ratio is equal to an integer. If it is determined that the length ratio is equal to an integer, the process proceeds to step S604. However, if it is determined that the length ratio is not equal to an integer, the process proceeds to step S603. Note that the length ratio may not be exactly equal to an integer, but the length ratio may be regarded as equal to an integer if the length ratio is within a small allowable range around an integer. The small allowable range may be specified by a user and the determination in step S602 may be performed depending on the specified range. This may apply also to other examples described below.

In step S603, the vertical length of the printing material size is changed such that the vertical length of the printing material size specified in the UI screen D1 is equal to an integral multiple of the vertical length of the paper folding size. More specifically, for example, the printing material size may be changed to be longer in the vertical direction than the value specified in the UI screen D1 such that the changed size is equal to a minimum allowable integral number times the vertical length of the paper folding size. In this case, for example, blank area may be added, in the vertical direction, to the printing material size to increase the vertical length of the printing material size. In changing the printing material size, instead of increasing the printing material size such that the printing material size is greater than the value specified in the UI screen D1, the printing material size may be reduced such that the printing material size is smaller than the specified value. For example, an area including no print object to which a recording agent is to be applied may be detected from the print data and the detected area may be deleted to reduce the printing material size. Also in this case, the printing material size is changed such that the vertical length of the printing material size is equal to a minimum allowable integral number times the vertical length of the paper folding size. Alternatively, a user may specify an integral number different from the minimum integral number described above, and the printing material size may be changed such that the vertical length of the printing material size is equal to the integral number specified by the user times the vertical length of the paper folding size. After the step S603 is completed, the process proceeds to step S604.

In step S604, a calculation is performed to determine the ratio of the horizontal length of the paper folding size set in the combo box 403 or the text box 404 to the horizontal length of the printing material size specified in the UI screen D1. Note that the horizontal direction of the paper folding size and that of the printing material size are defined as a direction perpendicular to the direction in which the printing material is conveyed. Depending on whether the calculated ratio is equal to an integer, the determination is made as to whether the horizontal length of the printing material size is an integral multiple of the horizontal length of the paper folding size. If it is determined that the ratio is equal to an integer, the process proceeds to step S606, but otherwise the process proceeds to step S605.

In step S605, the horizontal length of the printing material size is changed such that the horizontal length of the printing material size is equal to an integral multiple of the horizontal length of the paper folding size. For example, the printing material size is changed such that the printing material size is greater than the printing material size currently set according to the specification given in the UI screen D1 and the horizontal length of the printing material size is equal to a minimum integral number times the horizontal length of the paper folding size. In this case, for example, blank area may be added, in the horizontal direction, to the printing material size such that the horizontal length of the printing material size is increased. In changing the printing material size, instead of increasing the printing material size such that the printing material size is greater than the value specified in the UI screen D1, the printing material size may be reduced so as to be smaller than the specified value. For example, an area (a blank area) includes no object to which a recording agent is to be applied may be eliminated from the print data to reduce the printing material size so as to be smaller than the currently set size such that the horizontal length of the printing material size is equal to a minimum integral number times the horizontal length of the paper folding size. Alternatively, the printing material size may be changed such that the horizontal length of the printing material size is equal to an integral number, which is different from the minimum integral number, times the horizontal length of the paper folding size. After the step S605 is completed, the process proceeds to step S606.

In step S606, to meet the value specified in the combo box 408, the printing position of the print data in the printing area of the printing material is adjusted. The process then proceeds to step S607. In the process in step S606 described above, the adjustment of the printing position is not performed when the printing material size is not changed in either S603 or S605. In step S607, a determination is performed as to whether the check box 405 is checked. If it is determined that the check box 405 is checked, the process proceeds to step S608, but otherwise the process proceeds to step S609.

In step S608, the folding line position and the folding line form are determined based on the paper folding method and the paper folding size set in the combo box 402, the combo box 403, and the text box 404. Folding line image data is added to the print data such that the folding lines in the determined form are printed at the determined folding line positions. The process then proceeds to step S609. One of folding line forms may be that which indicates whether folding is to be performed in a mountain fold manner of a valley fold manner, although folding line forms may not need to distinguish between the mountain fold and the valley fold. In step S609, a determination is performed as to whether the check box 406 is checked. If it is determined that the check box 406 is checked, the process proceeds to step S610, but otherwise the process in step S501 is ended and the process proceeds to step S502.

In step S610, cutting line image data indicating a cutting line corresponding to the printing material size determined in the previous steps is added to the print data. Thus, the whole process in step S501 is completed, and the process proceeds to step S502.

Figure 7:
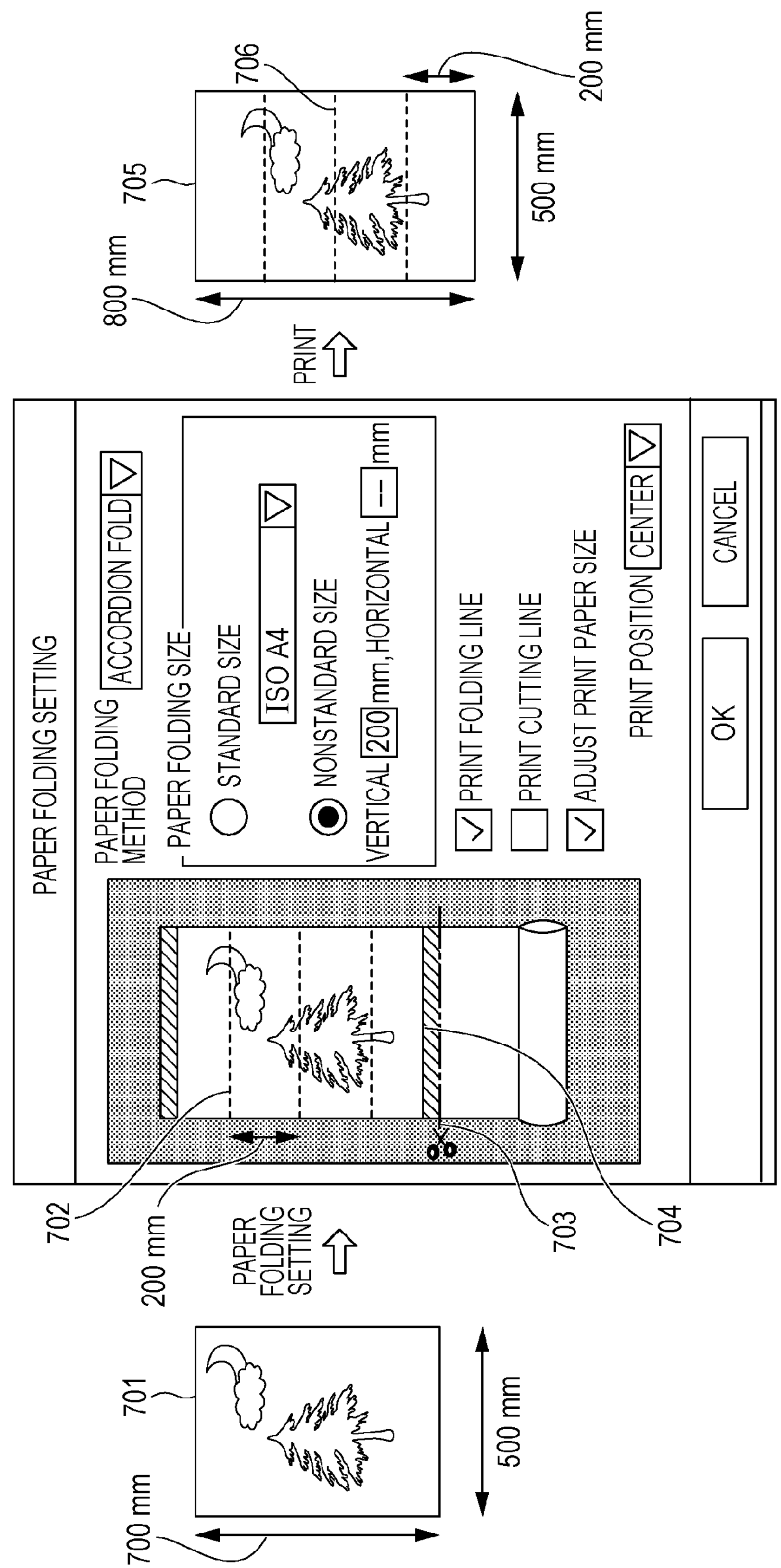
FIG. 7 is a diagram illustrating an example of a manner in which printing is performed according to paper folding setting.

FIG. 7 is a diagram illustrating an example of a process in which an image based on image data of a document with a size of 700 mm by 500 mm produced by the application 103 is printed on a sheet with a paper folding size of an integral number times 200 mm (vertically) by 500 mm (horizontally).

In the example shown in FIG. 7, a document 701 with a size of 700 mm (vertically) by 500 mm (horizontally) is produced by the application 103, and a nonstandard size of 700 mm by 500 mm is specified in the combo box 301 of the UI screen D1. The check box 304 is not checked. Note that the process may be performed in a similar manner also in a case in which image data of a document produced by the application 103 has a size different from that described above and this image data is changed in size to 700 mm by 500 mm. That is, for example, if another size is selected in the combo box 301, a 500 mm roll is selected in the combo box 303, and the check box 304 is checked, then the resultant document size may be 700 mm by 500 mm. Also in this case, the process may be performed in a similar manner. In the present example, paper folding setting is performed as follows.

Paper folding setting: Accordion fold

Paper folding size: Nonstandard size (200 mm in the vertical direction, undefined in the horizontal direction (roll paper width))

Print folding line: Checked

Print cutting line: Unchecked

Adjust printing material size: Checked

Print position: Center

Note that in the present example, in the setting of the printing material size to be an integral multiple of the paper folding size, the setting is performed such that the printing material size is greater than its original size and is set to be equal to an allowable minimum integral number times the paper folding size where the integral number is equal to or greater than 2. Resultant setting data is stored in the storage device 202.

Because the printing material size adjustment check box is checked, the printing material size changed to be equal to an integral number times the is displayed in the preview area 401. In FIG. 7, an area (a blank area 704) shaded with slanting lines indicates a part changed from (added to) the original printing material size. The horizontal length is equal to the roll paper width (500 mm) for both the paper folding size and the printing material size, and thus the horizontal length is not changed. Because the vertical length of the original printing material size is 700 mm, the vertical length is changed, in step S603, to be equal to an integral number times 200 mm which is the vertical length of the paper folding size, and thus the vertical length of the printing material size is changed to 800 mm.

In FIG. 7, the image of the document includes a folding line 702, a cutting line 703, and a blank area 704 added as a result of the adjustment of the printing material size, which are added to the image. In the present example, because the value of the combo box 408 is "center", the original document is positioned in the center of the printing area of the printing material with the adjusted printing material size. That is, two blank areas with the same length in the vertical direction are added such that one is located in an upper area in the original document and the other is in a lower area. In the present example, the vertical length of the original document size is 700 mm and the vertical length of the adjusted printing material is 800 mm, and thus there is a difference of 100 mm. One-half of this difference, i.e., 50 mm is assigned to each of the upper and lower areas. Note that the "blank area" is not limited to the literally blank area. For example, in a case where a background area is colored, the blank area colored in the same color as that of the background of the print data may be employed. In any case, the blank area may be added such that the added blank area does not result in artifact.

A printed material 705 is output from the printer 102 as a result of performing printing according to the setting described above. If the adjustment is not performed, the printed material has a size of 700 mm in the vertical direction and 500 mm in the horizontal direction, but the adjustment results in a change in size to 800 mm in the vertical direction and 500 mm (roll paper width) in the horizontal direction.

A user may fold the printed material in every length corresponding to the paper folding size of 200 mm specified by the user such that the folded size is exactly equal to the specified size, i.e., 200 mm by 500 mm. This folding may be performed easily and correctly even if the folding lines are not printed. In the present example, the size of the printed material 705 is equal to an integral number times 2 times the paper folding size, and thus if the printed material 705 is folded as many times as specified (twice in this specific example) such that two edges come together, and the printed material 705 is unfolded thereafter, then folding positions will be indicated without needing the printed folding lines. Thus the printed material 705 may be easily folded along these folding positions. When the printed material 705 is folded in the above-described manner, the resultant shape is beautiful and does not have a significant excess area smaller than the folding size.

In the example shown in FIG. 7, it is assumed by way of example that the document has a size of 700 mm in the vertical direction and 500 mm in the horizontal direction. Note that by performing the paper folding setting and performing printing in the same manner as described above for any other document size, all printed materials may have the same folding width of 200 mm. In this case, in a situation in which a user prints documents with various different sizes, the folded printed materials have the same width of 200 mm, and thus the user is allowed to put the printed materials in order into a stack having no irregularity at edges. The process described above is useful in particular when printing is performed by the printer 102 on a continuous sheet whose vertical direction may be arbitrarily determined as in the present embodiment.

Figure 8:
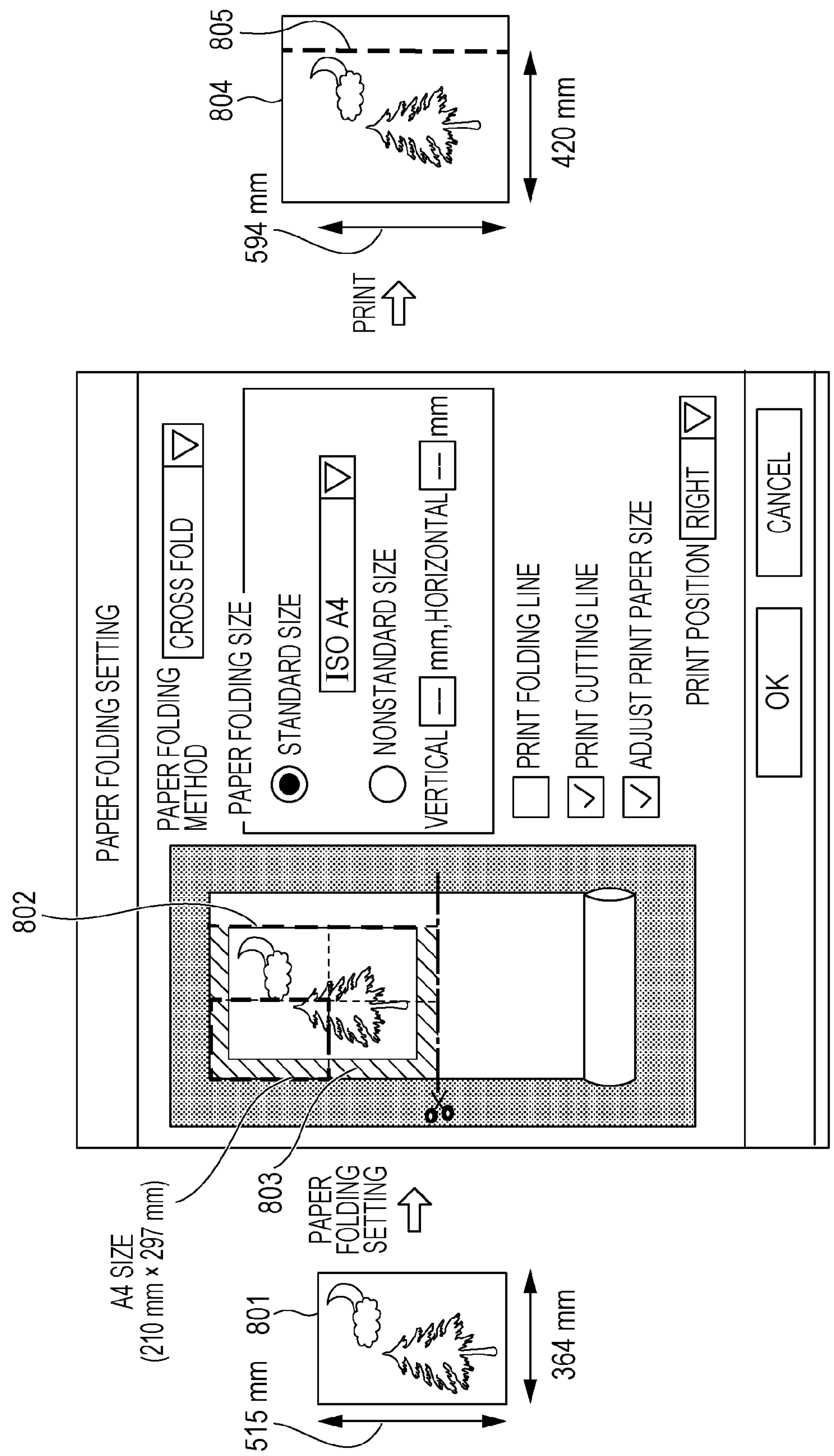
FIG. 8 is a diagram illustrating an example of a manner in which printing is performed according to paper folding setting.

FIG. 8 illustrates an example of a process of producing data of a document 801 with a JIS B3 size (515 mm in the vertical direction and 364 mm in the horizontal direction) using the application 103 and then performing printing on a sheet with a paper folding size of ISO A4 size (297 mm in the vertical direction and 210 mm in the horizontal direction). Also in this example, as in the example described above with reference to FIG. 7, the process may be performed in a similar manner also in a case in which image data of a document produced by the application 103 has a size different from that described above and the size of this image data is changed to the B3 size. In the present example, paper folding setting is performed as follows.

Paper folding method: Cross fold
Paper folding size: ISO A4 (297 mm in the vertical direction and 210 mm in the horizontal direction)
Print folding line: Unchecked
Print cutting line: Checked
Adjust printing material size: Checked
Print position: Right The present example is described further below with a focus on differences from the example described above with reference to FIG. 7. In the example shown in FIG. 8, the vertical length of the printing material size is 515 mm before adjustment. In step S603, the vertical length of the printing material size is changed to 594 mm, which is equal to an integral number times a vertical length of 297 mm specified as the paper folding size. In step S605, the horizontal length of the printing material size is changed from a value of 364 mm specified before the adjustment into 420 mm which is equal to an integral number times a horizontal length of 210 mm specified as the paper folding size. Thus, in the present example, the printing material size is changed in both vertical and horizontal directions. The size adjustment in both vertical and horizontal direction may be performed only when the cross fold is specified.

A cutting line 802 is for allowing a user to cut off printing material along it after an image is printed. A blank area 803 is an area that is added as a result of the adjustment of the printing material size. In the present example, the value selected in the combo box 408 is "right" and thus the original document is to be justified to the right of the printing area in printing. Thus, a blank area is added in an area to the left of the document in addition to blank areas with the same size at the top and bottom. In adding the blank areas, a printing area with a size 4 (2×2) times greater than the A4 size is assigned on printing material such that the left-hand edge of the printing area coincides with the left-hand edge of the printing material, blank areas are equally produced in upper and lower areas of the document, and the image of the document is positioned such that the right-hand edge of the document image coincides with the right-hand edge of the printing area. As a result, a blank area is created in the left-hand area, and a remainder in the right-hand area of the printing area is to be cut off along the cutting line 802.

A printed material 804 is output from the printer 102 as a result of printing performed according to the setting described above. When the check box 406 is checked, the printed material 804 has the cutting line 805 printed thereon. In a case where the cross fold is specified as the paper folding method and it is necessary to cut off the printed material 804 in a direction parallel to the direction of conveying the printing material, the check box 406 may be automatically checked to print the cutting line 805.

The user may cut off the printed material 804, printed via the above-described process, along the printed cutting line. As a result, the printed material is obtained which has a size two times greater in the vertical and horizontal direction than the ISO A4 size. The printed material is then folded on itself such that upper and lower edges come together. If the printed material is further folded on itself such that left and right edges come together, then the printed material is folded into the ISO A4 size. Thus, even when no folding line is printed, the user is allowed to easily fold the printed material into the desired paper folding size in a beautiful form.

Figure 9:
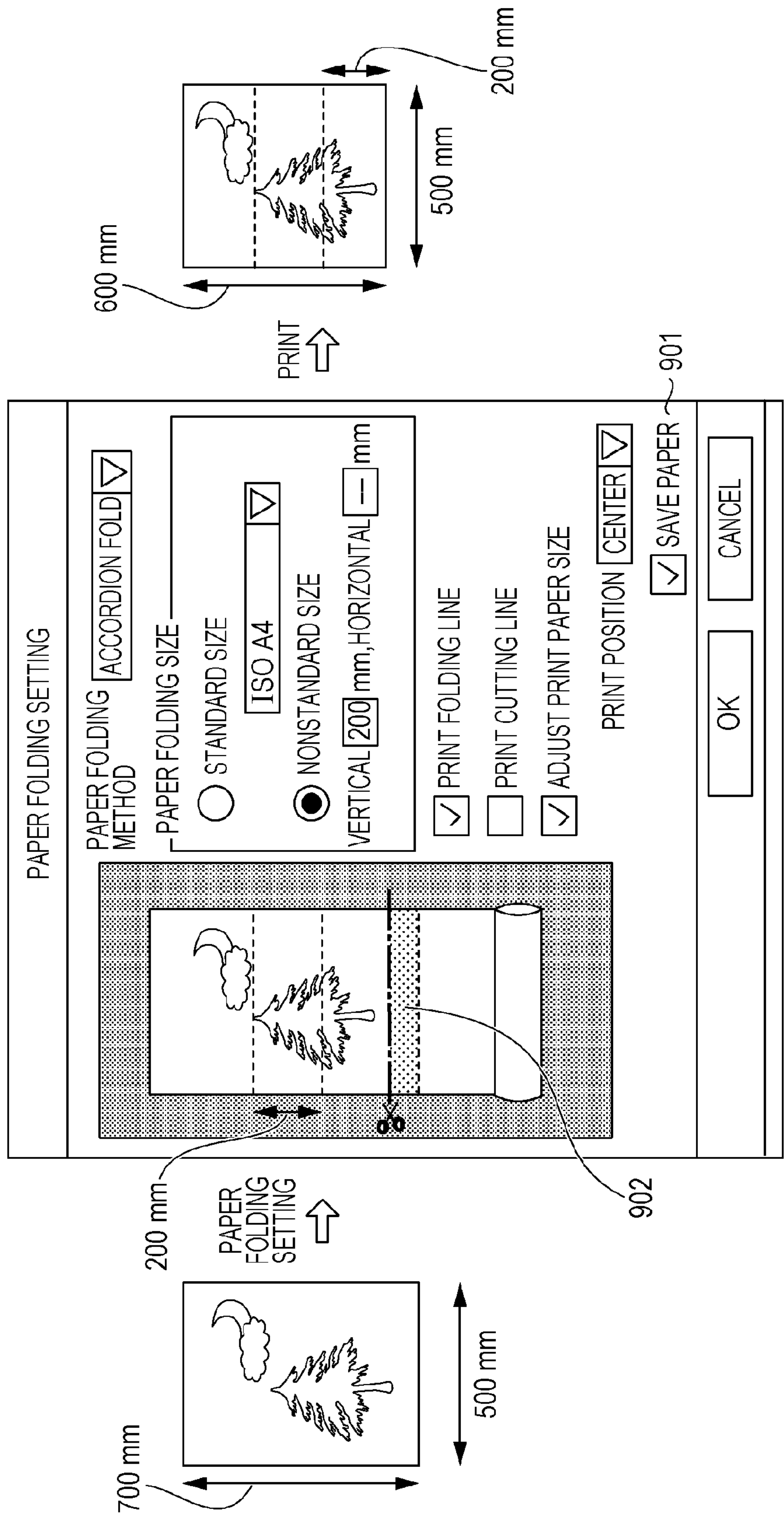
FIG. 9 is a diagram illustrating an example of a manner in which printing is performed according to paper folding setting.

FIG. 9 illustrates an example of a process that is different in steps S603 and S605 from the example shown in FIG. 7. In this example shown in FIG. 9, in steps S603 and S605, the printing material size is changed to be smaller than the original printing material size.

In this example, the dialog screen D2 additionally includes a check box 901 for specifying whether paper is to be saved. To reduce the printing material size, a user checks the check box 901. If the check box 901 is checked, the paper folding assist control unit 105 analyzes given print data to detect an area 902 including no print object in an end area, and reduces the printing material size by removing the detected area.

More specifically, the printing material size having a vertical length of 700 mm before adjustment is changed to a size which is smaller than the original size and which is equal to an integral number times the vertical length, 200 mm, of the paper folding size. In a case where an area with a vertical length of 100 mm is detected in the above-described analysis as the area including no print object, the detected area with the vertical length of 100 mm may be removed from the document image (print data) thereby changing the vertical length of the printing material size to 600 mm, which is equal to an integral number times the paper folding size.

Thus, in the example shown in FIG. 9, a user is allowed to save paper while achieving a printed material with a size equal to an integral number times the paper folding size specified by the user.

Second Embodiment

In a second embodiment described below, a binding margin area is provided in a side area in addition to setting the printing material size to be equal to an integral number times the paper folding size. In this example, it is possible to bind a printed material at its side end in a binder or the like and fold a remaining part a plurality of times equally into paper folding size.

Figure 10:
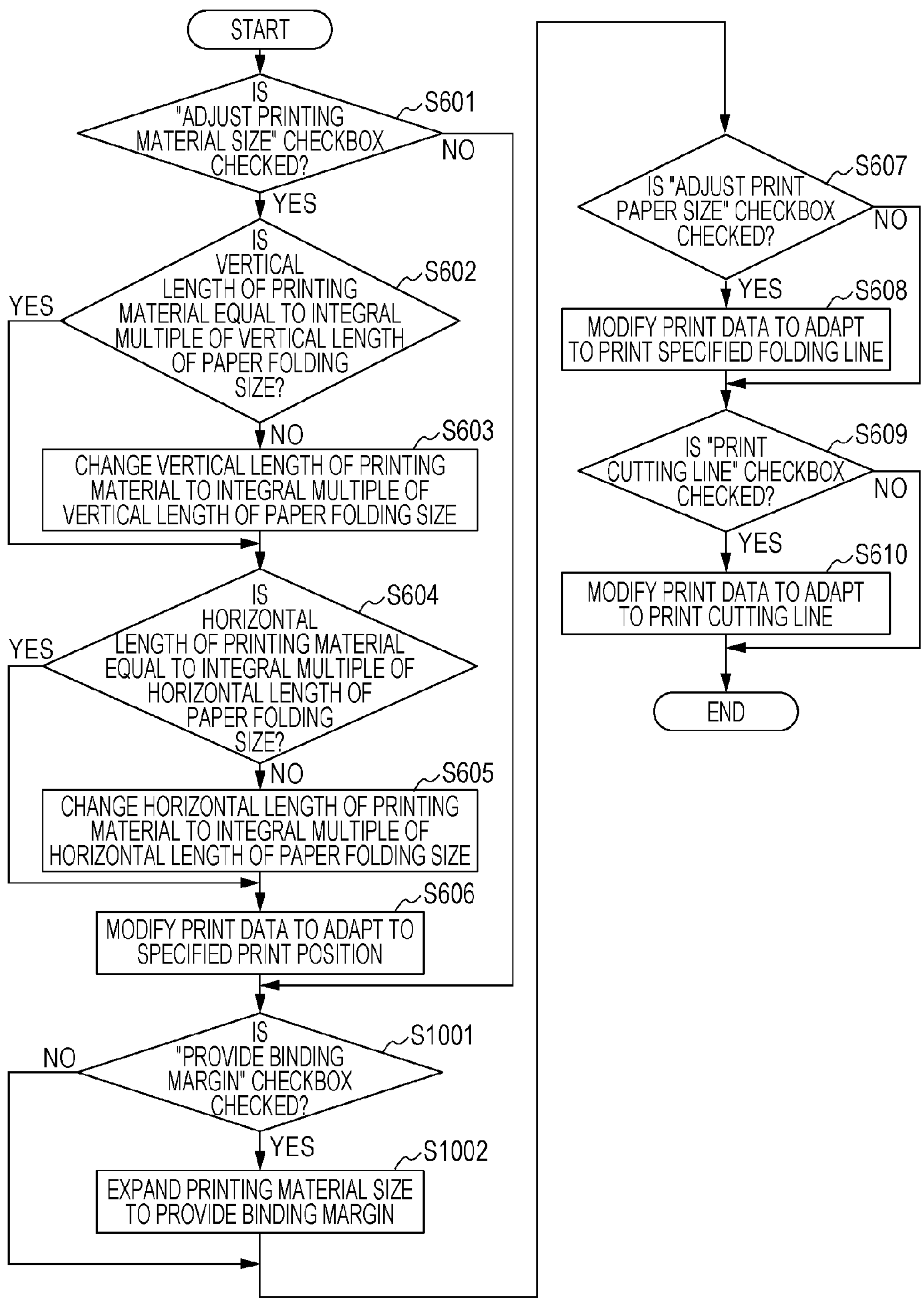
FIG. 10 is a flow chart illustrating an example of a process performed such that a binding margin is provided.
Figure 11:
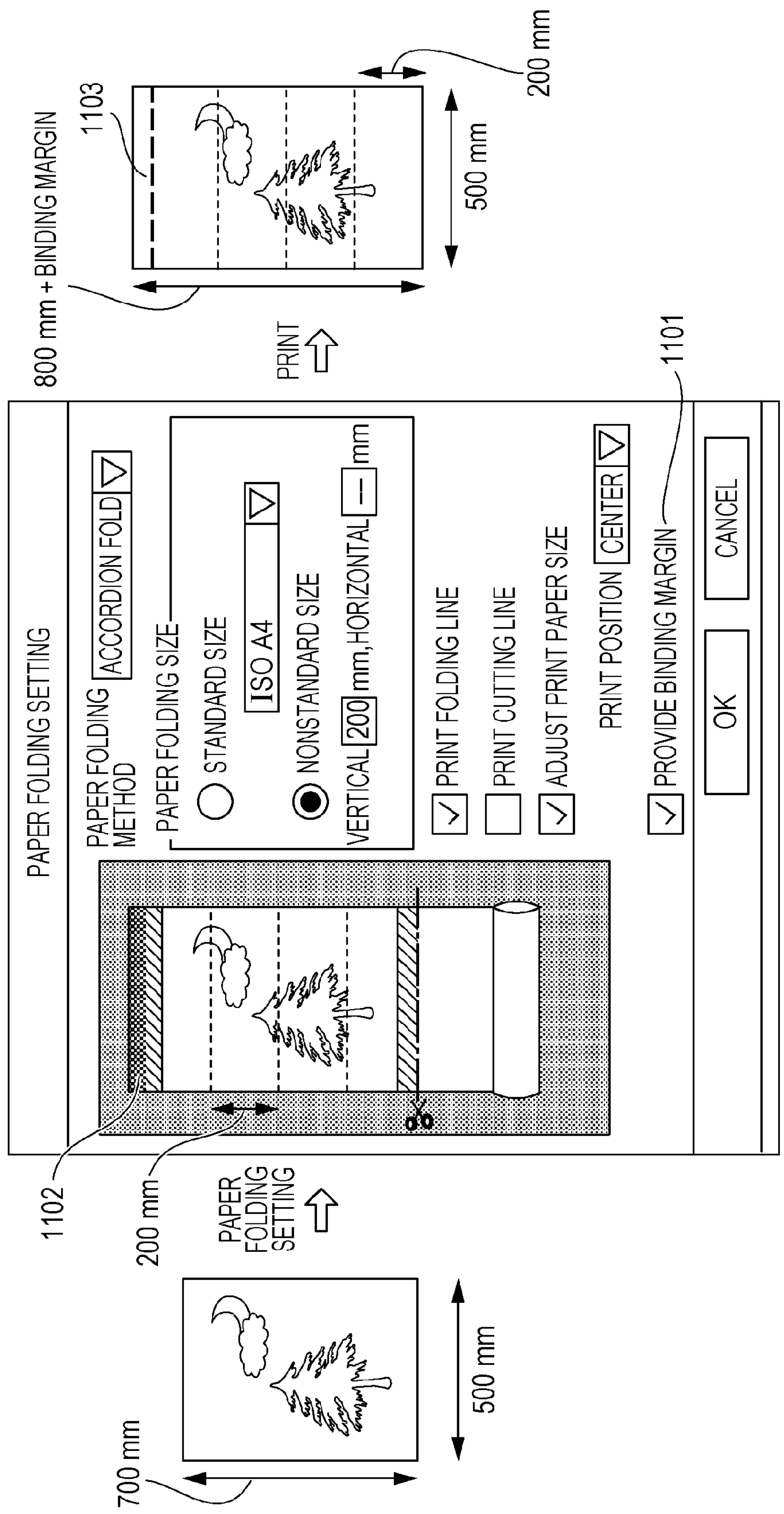
FIG. 11 is a diagram illustrating an example of a manner in which printing is performed according to paper folding setting.

FIG. 10 is a flow chart illustrating details of a process in step S501 according to a second embodiment. FIG. 11 illustrates a process of performing printing such that a binding margin is provided according to the second embodiment. In the second embodiment, the dialog screen D2 includes a check box 1101 for specifying whether a binding margin is provided.

Steps from S601 to S606 and steps from S607 to S610 are similar to those shown in FIG. 6, but an additional process is performed between steps S606 and S607. In step S1001 after step S606, a determination is performed as to whether providing a binding margin is specified, i.e., as to whether the check box 1101 is checked. If it is determined that the check box 1101 is checked, the process proceeds to step S1002, but otherwise the process proceeds to step S607.

In step S1002, the printing material size is increased to provide a binding margin area (i.e. a binding margin area is added). The process then proceeds to step S607. Note that the size and the location of the binding margin are not limited to fixed values, but the size and the location may be variable. In the present example, the printing material size is increased so as to create the binding margin area. Alternatively, the paper folding size may be slightly reduced such that the printing material size including the binding margin is equal to an integral number times the paper folding size specified by a user.

The example shown in FIG. 11 is different from that shown in FIG. 7 in that a binding margin area 1102 is added. A binding margin area 1103 is an area that is actually added to a printed material. In the example shown in FIG. 11, a line indicating a binding margin is not printed. Alternatively, a line may be printed to indicate a binding margin.

As described above, by providing a binding margin, it becomes possible for a user to store a printed material such that the printed material is folded into a desired paper folding size and bound using a binding margin by a binder or the like.

In the embodiments described above, it is assumed by way of example that the printing material size determined once is changed to be equal to an integral number times the paper folding size or equal to an integral number times the paper folding size plus a binding margin area. Alternatively, the final printing material size may be determined based on a document size (or an enlargement/reduction size of the document) and a paper folding size without performing the process of changing the printing material size.

Depending on the final printing material size determined in the above-described manner, an image to be printed may be zoomed in/out (enlarged or reduced).

In the embodiments described above, it is assumed by way of example that the PC 101 (the printer driver 104) determines the final printing material size. Alternatively, the printer 102 may determine the final printing material size as described below. Image data to be printed is input to the printer 102, and a paper folding size is specified in the printer 102. Depending on the specified paper folding size, the printing material size is determined and printing is performed in a similar manner as in the embodiments described above. To this end, the printer 102 is configured in internal structure in a similar manner to the PC 101 shown in FIG. 2 such that the printer 102 is capable of performing the process by executing a program as with the PC 101. In this case, the printer 102 functions as the print control apparatus.

The whole process described above does not need to be performed by a single computer (CPU), but may be performed by a plurality of computers in a cooperative manner. The whole process does not need to be performed by software, but part or all of the process may be performed by hardware such as an electric circuit, an ASIC (Application Specific Integrated Circuit), or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-177866 filed Aug. 16, 2011, which is hereby incorporated by reference herein in its entirety.

What is claimed is:

1. A print control apparatus comprising:

a specifying unit configured to specify a sheet folding size corresponding to a folding direction, the sheet folding size being a size of a sheet corresponding to the folding direction obtained after the sheet has been folded; and an output size specifying unit configured to specify an output size based on print setting information; and a changing unit configured to, if the output size in at least one direction of a printing material is not equal to an integer number times the specified folding size, change the output size to be equal to the integer number times the specified folding size, wherein the integer number is an integer that is equal to or greater than 2.

2. The print control apparatus according to claim 1, further comprising a layout determination unit configured to determine a position at which original image data is to be located on a printed sheet based on the output size and printing location set by a user.

3. The print control apparatus according to claim 1, further comprising a setting unit configured to set a binding margin, wherein the changing unit changes the output size in which the printing image is to be printed such that the output size is equal to the integer number times the specified folding size plus a size of the binding margin set by the setting unit.

4. The print control apparatus according to claim 1, wherein a position at which the sheet is to be cut off is determined, based on the output size being equal to the integer number times the specified folding size.

5. The print control apparatus according to claim 1, wherein the changing unit changes the output size such that it is equal to the integer number times the specified folding size by adding or removing data having a size corresponding to a difference between the output size and the integer number times the specified folding size, to or from original data to be printed.

6. The print control apparatus according to claim 1, further comprising a preview unit configured to display a preview image based on the output size, wherein the preview unit is configured to display a folding indication indicating a position at which the sheet is to be folded.

7. The print control apparatus according to claim 6, wherein the preview unit displays the printing image to be printed so as to make the difference between the output size specified based on setting for the printing image to be printed and the integer number times the specified folding size distinguishable.

8. The print control apparatus according to claim 1, further comprising a generation unit configured to generate, if a mountain fold and a valley fold are set, print data for printing a folding line in a form in which a mountain fold line and a valley fold line can be distinguished.

9. The print control apparatus according to claim 1, wherein, if paper saving is set, data having a size corresponding to a difference between the output size and the specified sheet folding size is removed from original data to be printed.

10. The print control apparatus according to claim 9, wherein the data to be removed corresponds to an area including no print object in the original data.

11. The print control apparatus according to claim 1, further comprising a display unit configured to display, if a sheet folding setting is set in a first screen for setting print setting information, a sheet folding setting screen for setting the sheet folding size.

12. A method of printing, comprising:

specifying a sheet folding size corresponding to a folding direction, the sheet folding size being a size of a sheet corresponding to the folding direction obtained after the sheet has been folded; and specifying an output size based on print setting information;

if the output size in at least one direction of a printing material is not equal to an integer number times the specified folding size, then changing the output size such that the output size is equal to the integer number times the specified folding size; and wherein the integer number is an integer that is equal to or greater than 2.

13. The print control method according to claim 12, further comprising generating, if a mountain fold and a valley fold are set, print data for printing a folding line in a form in which a mountain fold line and a valley fold line can be distinguished.

14. The print control method according to claim 12, wherein, if paper saving is set, data having a size corresponding to a difference between the output size and the specified sheet folding size is removed from original data to be printed.

15. The print method apparatus according to claim 14, wherein the data to be removed corresponds to an area including no print object in the original data.

16. The print control method according to claim 12, further comprising displaying, if a sheet folding setting is set in a first screen for setting print setting information, a sheet folding setting screen for setting the sheet folding size.

17. A non-transitory computer readable medium comprising a program configured to perform the method according to claim 12 by an apparatus.

* * * * *